May 27, 1930.    G. A. BURGESS    1,760,683
PEDAL OPERATED SWITCH
Filed Nov. 29, 1927    2 Sheets-Sheet 1

INVENTOR: GEORGE A. BURGESS,
by Robert Burns
ATT'Y.

May 27, 1930. G. A. BURGESS 1,760,683
PEDAL OPERATED SWITCH
Filed Nov. 29, 1927 2 Sheets-Sheet 2

INVENTOR:
GEORGE A. BURGESS,
by Robert Burns
ATT'Y

Patented May 27, 1930

1,760,683

UNITED STATES PATENT OFFICE

GEORGE A. BURGESS, OF WAUKEGAN, ILLINOIS, ASSIGNOR TO CHICAGO HARDWARE FOUNDRY COMPANY, OF NORTH CHICAGO, ILLINOIS, A CORPORATION OF ILLINOIS

PEDAL-OPERATED SWITCH

Application filed November 29, 1927. Serial No. 236,490.

This invention relates to that type of lavatory driers in which a fan wheel, electric heater, electric motor and motor controlling switch, are arranged in a closed housing, and more especially to means for effecting rapid opening and closing movements of the switch mechanism by a foot pedal associated with the supporting means of the drier, all as will hereinafter more fully appear.

To provide a structural formation and association of parts between a foot pedal and rapid opening and closing switch mechanism of the motor of the drier, whereby an operation of the same is attained in a certain and effective manner, all as will hereinafter more fully appear.

In the accompanying drawings:—

Like reference numerals indicate like parts in the several views.

Figure 1:
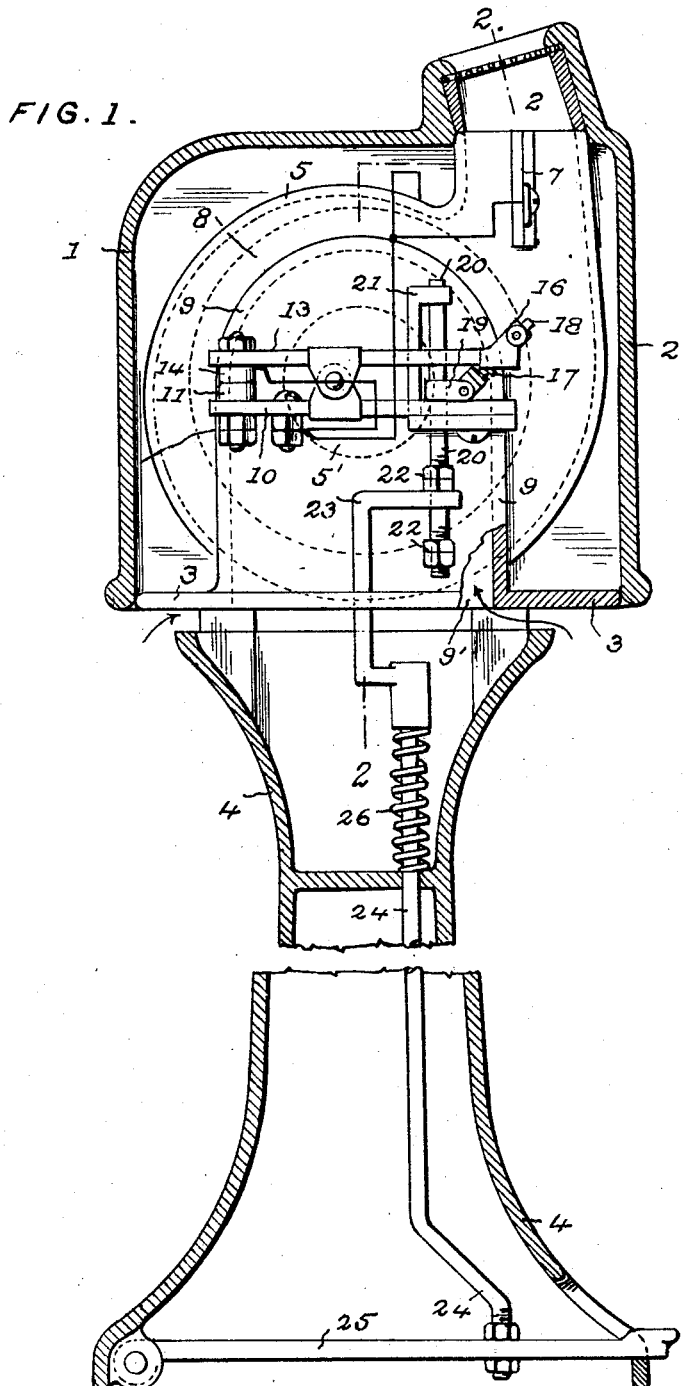
Fig. 1 is a side elevation with parts broken away and in section in line 1—1 Fig. 2, illustrating the general arrangement of parts in the preferred form of the invention.

The lavatory drier for which the present improvement is more especially intended comprises an open bottom rectangular shell or casing 1, provided on its top with a hot air outlet or nozzle 2, preferably arranged in an oblique manner as shown in Fig. 1, and with its open bottom enclosing and secured to a base plate 3, upon which are mounted the hereinafter described air mover or blower, electric motor for the same and the switch mechanism controlling said motor.

The base plate 3, is in turn fixedly attached to the upper end of a hollow supporting floor standard or pedestal 4, within which the hereinafter described pedal actuating means of the motor switch is housed and guided.

Figure 2:
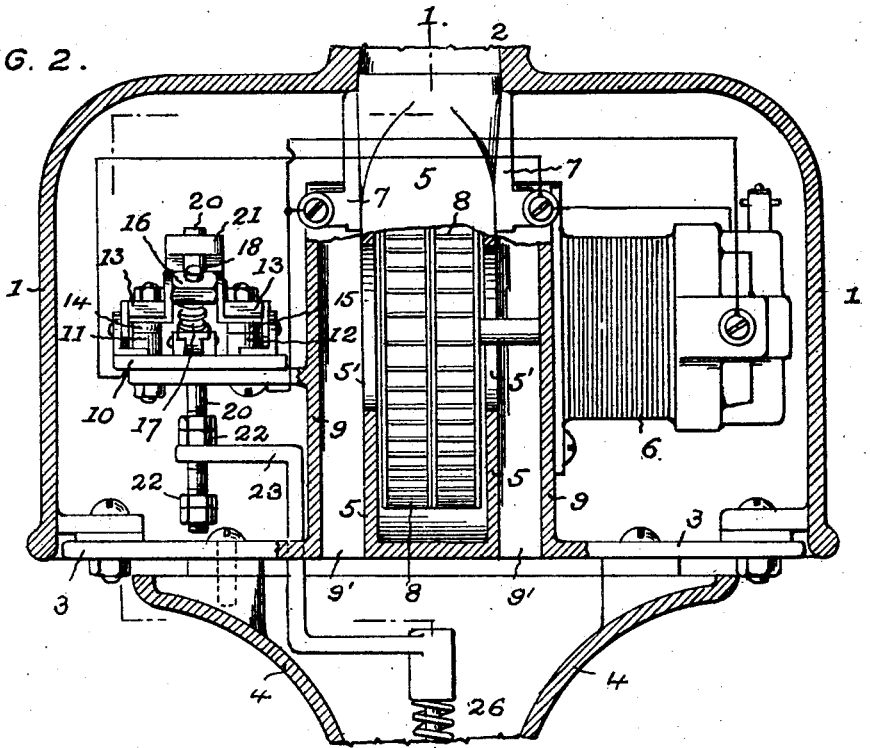
Fig. 2, is a front elevation, with parts of the enclosing housing and other parts in action in line 2—2, Fig. 1.
Figure 3:
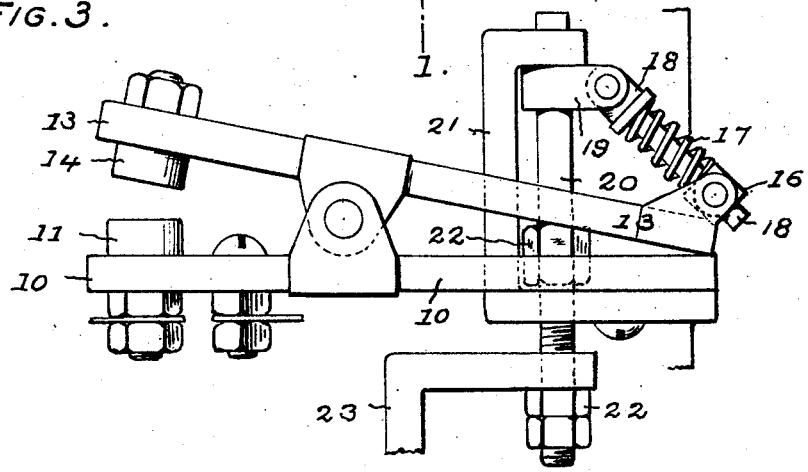
Fig. 3, is an enlarged detail elevation of the switch mechanism in a position the reverse of that shown in Fig. 1.

The shell or casing 5 of the air mover above referred to, is arranged centrally within the enclosing housing 1 of the apparatus and with the electric motor 6 arranged at one side of said casing 5, and the controlling switch of said motor is arranged at the opposite of said casing 5, as illustrated in Fig. 2.

As in my former application Serial No. 114,058, filed June 7, 1926, a heating element 7, of the electrical resistance type, is arranged in the outlet neck of the shell or casing 5 of the air mover or blower with said outlet neck having communication with the aforesaid outlet or nozzle 2 of the main housing 1.

In the construction shown, the fan wheel 8 of the air mover is revolvably mounted in the casing 5, and is of the twin section type having central intake eyes in the respective side walls, and in connection therewith said side walls 5 are formed with orifices 5' aligned with said central intake eyes of the fan wheel 8. Closed inlet trunks 9 are associated with the side walls of the air mover casing 5 and at their closed ends having communication with the aforesaid orificed 5' while their other and open end 10 passes down through the base plate 3, for communication with the outer atmosphere.

The controlling switch mechanism of the operating electric motor 6, is of the "snap" or rapid opening and closing type, and preferably of a detail construction the same as set forth in the aforesaid application Serial No. 114,058. In this, a fixed plate or bar 10 of insulating material is mounted at one side of the air mover,—casing 5, and carries a pair of contact members 11 and 12, one of which is connected to the supply line of the operating electric circuit, while the other is connected to the return line of said circuit.

Pivotally associated with the fixed plate or bar 10, are a pair of companion bars 13, of insulating material, carrying individual contact members 14, 15, one of which is in the supply line and the other in return line of the operating electric circuit. Said contact carrying bars 13, have their pivotal point at their mid-length, and at the ends opposite to their contact members 14, 15 are operatively connected to an actuating "snap" mechanism as follows:

Journalled in the last mentioned ends of the bars 13, is an abutment block 16 against which a compression spring 17 has abutment, with said block in addition affording guiding means for a toggle rod or link 18 arranged within said spring. Said toggle rod at the end opposite to the end which is guided as above set forth, is provided with an abutment for an end of the spring 17 aforesaid, and is pivotally attached to a bracket block 19, fixedly secured to a bar or rod 20, that has reciprocation in a plane in right angle relation to the plane of the contact carrying members 10, 13 aforesaid, with said bar or rod 20 moving in a stationary guide frame 21, as shown.

At its lower end, the reciprocating bar or rod 20, carries a pair of fixed stops 22, 22, preferably in the form of adjustable nuts arranged on a screw thread formation of the bar or rod 20, as shown, said stops being arranged in spaced relation, a divisional portion of the full throw of movement of the rod or bar 20.

A cross-head 23 having limited independent movement on the rod or bar 20 aforesaid, and between the stops 22 thereof, is fixedly connected to the upper end of a downwardly extending operating rod or link 24, the lower end of which is operatively connected to a pedal lever 25 pivoted in the lower portion of the hollow standard 4 of the apparatus, with the free end of said pedal lever projecting out through a wall of the standard 4 for convenient actuation by a foot of a person using the apparatus.

The operating rod or link 24 is normally maintained in its upper position by a spring 26 and in such position moves and maintains the contact members 11, 12 and 14, 14 in separated relation, through the intermediate connections above described.

The operation of the spring 17 and toggle link 18 connections between the reciprocating bar or rod 20 and the ends of the movable contact bars 13, is the same as in my aforesaid application Serial No. 114,058, to wit:

The movement of the toggle link 18 to a point slightly past a line drawn between its point of pivotal connection with the movable contact carrying bars 13 and the point of pivotal connection of said bars 13, with its companion stationary plate or bar 10, takes place without any movement between said movable and stationary contact carrying bars 10 and 13. On reaching the above mentioned point past the line extending between the described pivots, the spring 17 which has been compressed during such initial movement, now acts to effect either a rapid separation of the contact points 11, 12 and 14, 15 or a rapid connection of said contact points, as the case may be in the series of operations of the apparatus.

Having thus fully described my invention, what I claim and desire to secure by Letters Patent, is:

A switch mechanism for electric lavatory driers of the herein described pedestal type, comprising a controlling switch of the snap type, a reciprocating rod having operative relation to said switch, a toggle link pivotally connected at one end to said reciprocating rod, an abutment head journalled on the movable contact carrying member of the switch and having guiding connection with the other end of the aforesaid toggle link, a spring having an abutment at one end on the said toggle link and at the other end against the aforesaid abutment head, a depending rod, means for yieldingly moving said depending rod in one direction, a pedal lever having operative connection with the lower end of said depending rod, and a connecting means of the limited independent movement type intermediate of the aforesaid reciprocating rod and the said depending rod.

In testimony whereof I hereunto affix my signature.

GEORGE A. BURGESS.